United States Patent
McCune et al.

(10) Patent No.: US 9,410,608 B2
(45) Date of Patent: *Aug. 9, 2016

(54) FLEXIBLE SUPPORT STRUCTURE FOR A GEARED ARCHITECTURE GAS TURBINE ENGINE

(71) Applicant: United Technologies Corporation, Hartford, CT (US)

(72) Inventors: Michael E. McCune, Colchester, CT (US); Jason Husband, South Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 606 days.

This patent is subject to a terminal disclaimer.

(21) Appl. No.: 13/938,466

(22) Filed: Jul. 10, 2013

(65) Prior Publication Data

US 2013/0331223 A1    Dec. 12, 2013

Related U.S. Application Data

(63) Continuation of application No. 13/623,309, filed on Sep. 20, 2012, now Pat. No. 9,133,729, which is a continuation-in-part of application No. 13/342,508, filed on Jan. 3, 2012, now Pat. No. 8,297,916.

(60) Provisional application No. 61/494,453, filed on Jun. 8, 2011.

(51) Int. Cl.
  *F16H 57/028*   (2012.01)
  *F02C 7/36*     (2006.01)
  *F01D 25/16*    (2006.01)

(52) U.S. Cl.
  CPC ............ *F16H 57/028* (2013.01); *F01D 25/164* (2013.01); *F02C 7/36* (2013.01); *F05D 2260/40311* (2013.01); *F05D 2300/501* (2013.01)

(58) Field of Classification Search
  None
  See application file for complete search history.

(56) References Cited

U.S. PATENT DOCUMENTS

| 3,287,906 A | 11/1966 | McCormick |
| 3,754,484 A | 8/1973  | Roberts   |

(Continued)

FOREIGN PATENT DOCUMENTS

| CA | 2789325 | 4/2013 |
| CA | 2789465 | 4/2013 |

(Continued)

OTHER PUBLICATIONS

International Preliminary Report on Patentability for International Application No. PCT/US2013/060105 mailed on Apr. 2, 2015.

(Continued)

*Primary Examiner* — Ninh H Nguyen
*Assistant Examiner* — Justin Seabe
(74) *Attorney, Agent, or Firm* — Carlson, Gaskey & Olds, P.C.

(57) ABSTRACT

A geared architecture for a gas turbine engine according to an exemplary aspect of the present disclosure includes, among other things, a fan shaft, a frame which supports the fan shaft, the frame defines a frame stiffness and a plurality of gears which drives the fan shaft. A flexible support defines a flexible support stiffness that is less than the frame stiffness. The plurality of gears are supported by at least one of a carrier and the flexible support and an input coupling to the plurality of gears, the input coupling defines an input coupling stiffness with respect to the frame stiffness.

27 Claims, 8 Drawing Sheets

(56) References Cited

U.S. PATENT DOCUMENTS

| | | | |
|---|---|---|---|
| 3,892,358 A | 7/1975 | Gisslen | |
| 4,084,861 A * | 4/1978 | Greenberg | F01D 25/164 384/105 |
| 4,090,416 A * | 5/1978 | Hicks | F16D 3/185 475/317 |
| 4,130,872 A | 12/1978 | Harloff | |
| 5,433,674 A | 7/1995 | Sheridan et al. | |
| 5,447,411 A | 9/1995 | Curley et al. | |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,073,439 A | 6/2000 | Beaven et al. | |
| 6,223,616 B1 | 5/2001 | Sheridan | |
| 6,260,351 B1 | 7/2001 | Delano | |
| 6,318,070 B1 | 11/2001 | Rey et al. | |
| 6,663,530 B2 | 12/2003 | Poulin et al. | |
| 6,735,954 B2 | 5/2004 | MacFarlane et al. | |
| 6,814,541 B2 | 11/2004 | Evans et al. | |
| 6,855,089 B2 | 2/2005 | Poulin et al. | |
| 6,895,741 B2 | 5/2005 | Rago et al. | |
| 7,021,042 B2 | 4/2006 | Law | |
| 7,104,918 B2 | 9/2006 | Mitrovic | |
| 7,144,349 B2 | 12/2006 | Mitrovic | |
| 7,223,197 B2 | 5/2007 | Poulin et al. | |
| 7,451,592 B2 | 11/2008 | Taylor et al. | |
| 7,591,754 B2 | 9/2009 | Duong et al. | |
| 7,631,484 B2 | 12/2009 | Giffin et al. | |
| 7,665,293 B2 | 2/2010 | Wilson et al. | |
| 7,704,178 B2 | 4/2010 | Sheridan | |
| 7,824,305 B2 | 11/2010 | Duong et al. | |
| 7,841,163 B2 | 11/2010 | Welch et al. | |
| 7,841,165 B2 | 11/2010 | Orlando | |
| 7,926,260 B2 | 4/2011 | Sheridan et al. | |
| 7,959,532 B2 | 6/2011 | Suciu et al. | |
| 8,001,763 B2 | 8/2011 | Grabowski et al. | |
| 8,172,717 B2 | 5/2012 | Lopez et al. | |
| 8,205,432 B2 | 6/2012 | Sheridan | |
| 8,297,916 B1 | 10/2012 | McCune et al. | |
| 8,640,336 B2 | 2/2014 | Sheridan et al. | |
| 2007/0214795 A1 | 9/2007 | Cooker et al. | |
| 2008/0044276 A1 | 2/2008 | McCune | |
| 2008/0098713 A1 | 5/2008 | Orlando et al. | |
| 2010/0105516 A1 | 4/2010 | Sheridan et al. | |
| 2010/0148396 A1 | 6/2010 | Xie et al. | |
| 2010/0331139 A1 | 12/2010 | McCune | |
| 2011/0116510 A1 | 5/2011 | Breslin et al. | |
| 2011/0130246 A1 | 6/2011 | McCune et al. | |
| 2011/0286836 A1 | 11/2011 | Davis | |
| 2013/0224003 A1 | 8/2013 | Kupratis et al. | |

FOREIGN PATENT DOCUMENTS

| | | |
|---|---|---|
| EP | 253548 | 1/1988 |
| EP | 2270361 A2 | 1/2011 |
| EP | 2532841 A2 | 12/2012 |
| EP | 2551488 A2 | 1/2013 |
| GB | 1516041 | 6/1978 |
| GB | 2041090 | 9/1980 |
| WO | 2007038674 | 4/2007 |
| WO | 2014047040 A1 | 3/2014 |

OTHER PUBLICATIONS

European Search Report for European Application No. 15152745.4 mailed Jun. 15, 2015.
European Search Report for European Patent Application No. 15175205.2 mailed Oct. 15, 2015.
European Search Report for European Patent Application No. 15175203.7 mailed Oct. 11, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Kiley & Sons, Inc. New York: New York.
Brines, G.L. (1990). The turbofan of tomorrow. Mechanical Engineering: The Journal of the American Society of Mechanical Engineers,108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.

(56) References Cited

OTHER PUBLICATIONS

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.
Dickey, T.A. and Dobak, E.R. (1972). The evolution and development status of ALF 502 turbofan engine. National Aerospace Engineering and Manufacturing Meeting. San Diego, California. Oct. 2-5, 1972.
Gunston, B. (Ed.) (2000). Jane's aero-engines, Issue seven. Coulsdon, Surrey, UK: Jane's Information Group Limited.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8), p. 32.
Hendricks, E.S. and Tong, M.T. (2012). Performance and weight estimates for an advanced open rotor engine. NASA/TM-2012-217710.
Guynn, M. D., Berton, J.J., Fisher, K. L, Haller, W.J., Tong, M. T., and Thurman, D.R. (2011). Refined exploration of turbofan design options for an advanced single-aisle transport. NASA/TM-2011-216883.
Zalud, T. (1998). Gears put a new spin on turbofan performance. Machine Design, 70(20), p. 104.
Hughes, C. (2010). Geared turbofan technology. NASA Environmentally Responsible Aviation Project. Green Aviation Summit. NASA Ames Research Center. Sep. 8-9, 2010.
European Search Report for for European application No. 13828967.3 dated Oct. 14, 2014.
European Search Report for for European application No. 14155460.0 dated Sep. 2, 2014.
NASA, Engine Weight Model, Glenn Research Center, retrieved from, http://www.grc.nasa.gov/WWW/K-12/airplane/turbwt.html, Mar. 11, 2016.
European Search Report for European Patent Application No. 12170479.5 completed on Jun. 26, 2014.
Grzegorz Litak et al.: "Dynamics of a Gear System with Faults in Meshing Stiffness", Nonlinear Dynamics, Kluwer Academic Publishers, DO, vol. 41, No. 4, Sep. 1, 2005, pp. 415-421.
European Search Report for European Patent Application No. 12170483.7 completed Apr. 29, 2014.
International Search Report and Written Opinion for International Application No. PCT/US2013/060105 completed on Jan. 30, 2014.

\* cited by examiner

FLEXIBLE SUPPORT STRUCTURE FOR A GEARED ARCHITECTURE GAS TURBINE ENGINE

CROSS REFERENCE TO RELATED APPLICATIONS

The present disclosure is a continuation of U.S. patent application Ser. No. 13/623,309, filed Sep. 20, 2012, which is a continuation-in-part of U.S. patent application Ser. No. 13/342,508, filed Jan. 3, 2012, which claims priority to U.S. Provisional Patent Application No. 61/494,453, filed Jun. 8, 2011.

BACKGROUND

The present disclosure relates to a gas turbine engine, and more particularly to a flexible support structure for a geared architecture therefor.

Epicyclic gearboxes with planetary or star gear trains may be used in gas turbine engines for their compact designs and efficient high gear reduction capabilities. Planetary and star gear trains generally include three gear train elements: a central sun gear, an outer ring gear with internal gear teeth, and a plurality of planet gears supported by a planet carrier between and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output.

In gas turbine engine applications, where a speed reduction transmission is required, the central sun gear generally receives rotary input from the powerplant, the outer ring gear is generally held stationary and the planet gear carrier rotates in the same direction as the sun gear to provide torque output at a reduced rotational speed. In star gear trains, the planet carrier is held stationary and the output shaft is driven by the ring gear in a direction opposite that of the sun gear.

During flight, light weight structural cases deflect with aero and maneuver loads causing significant amounts of transverse deflection commonly known as backbone bending of the engine. This deflection may cause the individual sun or planet gear's axis of rotation to lose parallelism with the central axis. This deflection may result in some misalignment at gear train journal bearings and at the gear teeth mesh, which may lead to efficiency losses from the misalignment and potential reduced life from increases in the concentrated stresses.

SUMMARY

A geared architecture for a gas turbine engine according to an exemplary aspect of the present disclosure includes, among other things, a fan shaft, a frame which supports the fan shaft, the frame defines a frame stiffness and a plurality of gears which drives the fan shaft. A flexible support defines a flexible support stiffness that is less than the frame stiffness. The plurality of gears are supported by at least one of a carrier and the flexible support and an input coupling to the plurality of gears, the input coupling defines an input coupling stiffness with respect to the frame stiffness.

In a further non-limiting embodiment of the foregoing geared architecture, the frame and the flexible support are mounted to a static structure of a gas turbine engine.

In a further non-limiting embodiment of either of the foregoing geared architectures, the frame and the flexible support are mounted to a front center body of a gas turbine engine.

In a further non-limiting embodiment of any of the foregoing geared architectures, the input coupling is mounted to a sun gear of the gear system.

In a further non-limiting embodiment of any of the foregoing geared architectures, the fan shaft is mounted to a ring gear of the gear system.

In a further non-limiting embodiment of any of the foregoing geared architectures, the plurality of gears form a star system.

In a further non-limiting embodiment of any of the foregoing geared architectures, the fan shaft is mounted to a planet carrier of the gear system.

In a further non-limiting embodiment of any of the foregoing geared architectures, the plurality of gears form a planet system.

In a further non-limiting embodiment of any of the foregoing geared architectures, a low speed spool drives the input coupling.

In a further non-limiting embodiment of any of the foregoing geared architectures, the flexible support stiffness defines at least one of a lateral stiffness and a transverse stiffness, the frame stiffness defines at least one of a lateral stiffness and a transverse stiffness, and the input coupling stiffness defines at least one of a lateral stiffness and a transverse stiffness.

In a further non-limiting embodiment of any of the foregoing geared architectures, at least one of the flexible support stiffness and the input coupling stiffness are less than about 20% of the frame stiffness.

In a further non-limiting embodiment of any of the foregoing geared architectures, the flexible support stiffness and the input coupling stiffness are each less than about 20% of the frame stiffness.

In a further non-limiting embodiment of any of the foregoing geared architectures, at least one of the flexible support stiffness and the input coupling stiffness are less than about 11% of the frame stiffness.

In a further non-limiting embodiment of any of the foregoing geared architectures, the flexible support stiffness and the input coupling stiffness are each less than about 11% of the frame stiffness.

In a further non-limiting embodiment of any of the foregoing geared architectures, the frame which supports the fan shaft and defines the frame stiffness is a K-frame bearing support, the K-frame bearing support supporting a bearing system that supports the fan shaft.

A geared architecture for a gas turbine engine according to an exemplary aspect of the present disclosure includes, among other things, a fan shaft, a frame which supports the fan shaft and a plurality of gears which drives the fan shaft, the plurality of gears includes a gear mesh that defines a gear mesh. A flexible support defines a flexible support stiffness that is less than a gear mesh stiffness. The plurality of gears are supported by at least one of a carrier and the flexible support an input coupling to the plurality of gears, the input coupling defines an input coupling stiffness with respect to the gear mesh stiffness.

In a further non-limiting embodiment of the foregoing geared architecture, the flexible support stiffness defines at least one of a lateral stiffness and a transverse stiffness, the gear mesh stiffness defines at least one of a lateral stiffness and a transverse stiffness, and the input coupling stiffness defines at least one of a lateral stiffness and a transverse stiffness.

In a further non-limiting embodiment of either of the foregoing geared architectures, the flexible support stiffness is less than about 8% of the gear mesh stiffness.

In a further non-limiting embodiment of any of the foregoing geared architectures, the input coupling stiffness is less than about 5% of the gear mesh stiffness.

In a further non-limiting embodiment of any of the foregoing geared architectures, at least one of a lateral stiffness and a transverse stiffness of a ring gear of the plurality of gears is less than about 20% of the gear mesh lateral stiffness.

In a further non-limiting embodiment of any of the foregoing geared architectures, at least one of a lateral stiffness and a transverse stiffness of a ring gear of the plurality of gears is less than about 12% of the gear mesh stiffness.

In a further non-limiting embodiment of any of the foregoing geared architectures, at least one of a lateral stiffness and a transverse stiffness of a planet journal bearing which supports a planet gear of the plurality of gears is less than or equal to the gear mesh stiffness.

In a further non-limiting embodiment of any of the foregoing geared architectures, the gear mesh stiffness is defined between a sun gear and a multiple planet gears of the plurality of gears.

In a further non-limiting embodiment of any of the foregoing geared architectures, the plurality of gears floats with the fan shaft.

In a further non-limiting embodiment of any of the foregoing geared architectures, a planet journal bearing which supports a planet gear of the plurality of gears defines at least one of a lateral stiffness and a transverse stiffness with respect to the gear mesh stiffness.

In a further non-limiting embodiment of any of the foregoing geared architectures, a ring gear of the plurality of gears defines at least one of a lateral stiffness and a transverse stiffness with respect to the gear mesh stiffness.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
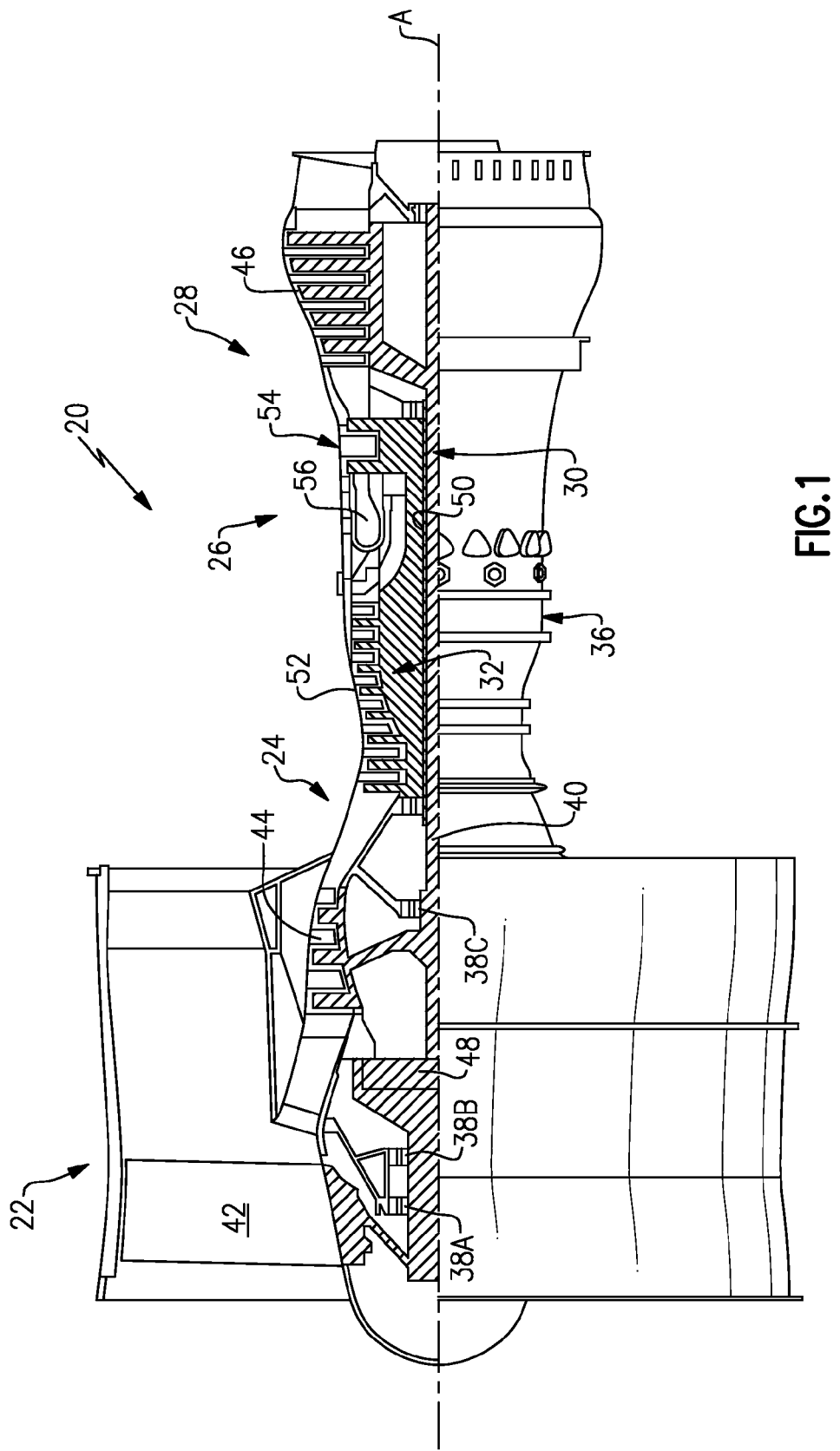
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool architecture gas turbine engine and an open rotor (unducted fan) engine.

The engine 20 generally includes a low speed spool 30 and a high speed spool 32 mounted for rotation about an engine central longitudinal axis A relative to an engine static structure 36 via several bearing systems 38A-38C. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion of the airflow passing therethrough.

Figure 2:
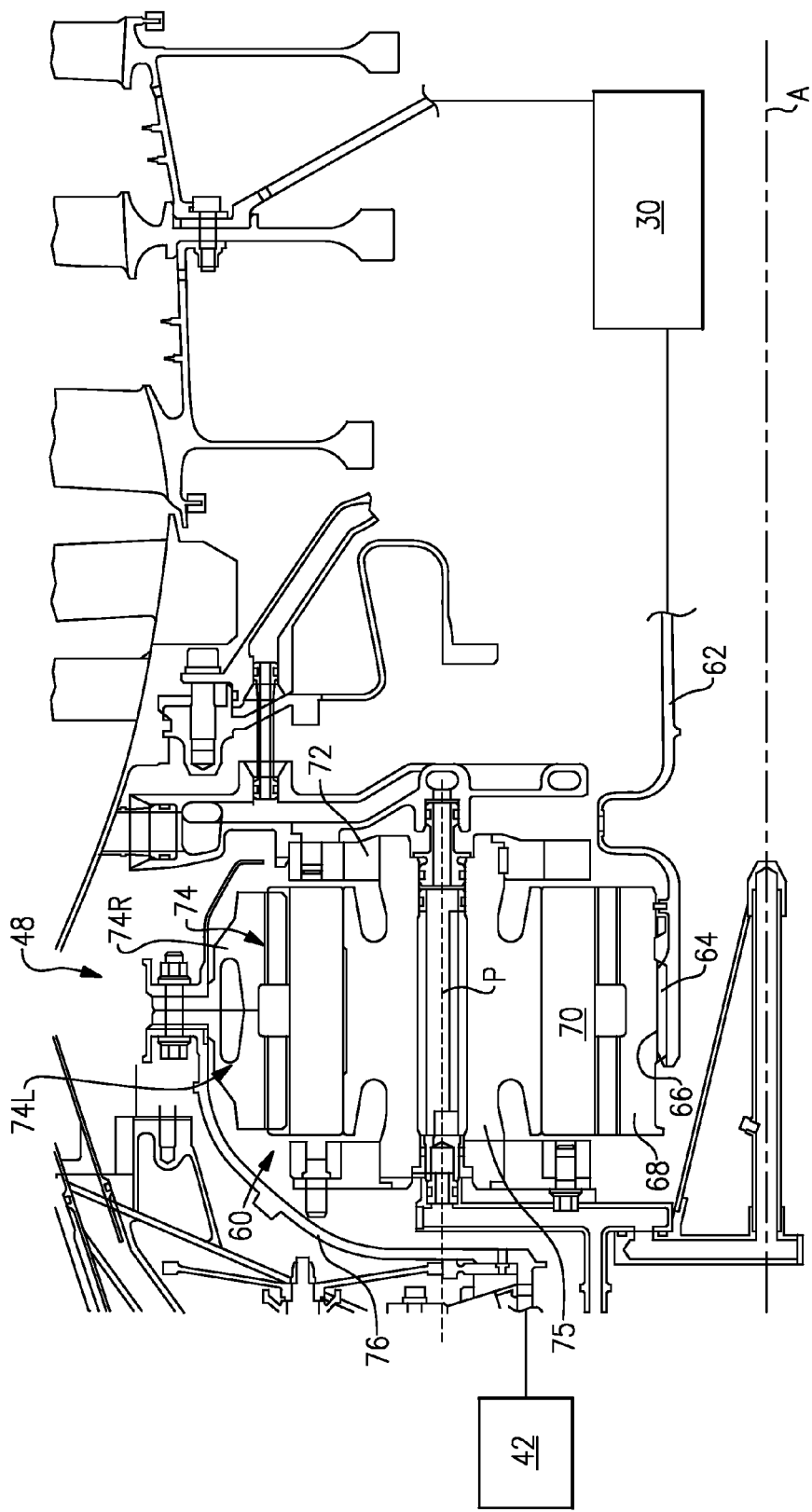
FIG. 2 is an enlarged cross-section of a section of the gas turbine engine which illustrates a fan drive gear system (FDGS)

With reference to FIG. 2, the geared architecture 48 generally includes a fan drive gear system (FDGS) 60 driven by the low speed spool 30 (illustrated schematically) through an input coupling 62. The input coupling 62 both transfers torque from the low speed spool 30 to the geared architecture 48 and facilitates the segregation of vibrations and other transients therebetween. In the disclosed non-limiting embodiment, the FDGS 60 may include an epicyclic gear system which may be, for example, a star system or a planet system.

The input coupling 62 may include an interface spline 64 joined, by a gear spline 66, to a sun gear 68 of the FDGS 60. The sun gear 68 is in meshed engagement with multiple planet gears 70, of which the illustrated planet gear 70 is representative. Each planet gear 70 is rotatably mounted in a planet carrier 72 by a respective planet journal bearing 75. Rotary motion of the sun gear 68 urges each planet gear 70 to rotate about a respective longitudinal axis P.

Each planet gear 70 is also in meshed engagement with rotating ring gear 74 that is mechanically connected to a fan shaft 76. Since the planet gears 70 mesh with both the rotating ring gear 74 as well as the rotating sun gear 68, the planet gears 70 rotate about their own axes to drive the ring gear 74 to rotate about engine axis A. The rotation of the ring gear 74 is conveyed to the fan 42 (FIG. 1) through the fan shaft 76 to thereby drive the fan 42 at a lower speed than the low speed spool 30. It should be understood that the described geared architecture 48 is but a single non-limiting embodiment and that various other geared architectures will alternatively benefit herefrom.

Figure 3:
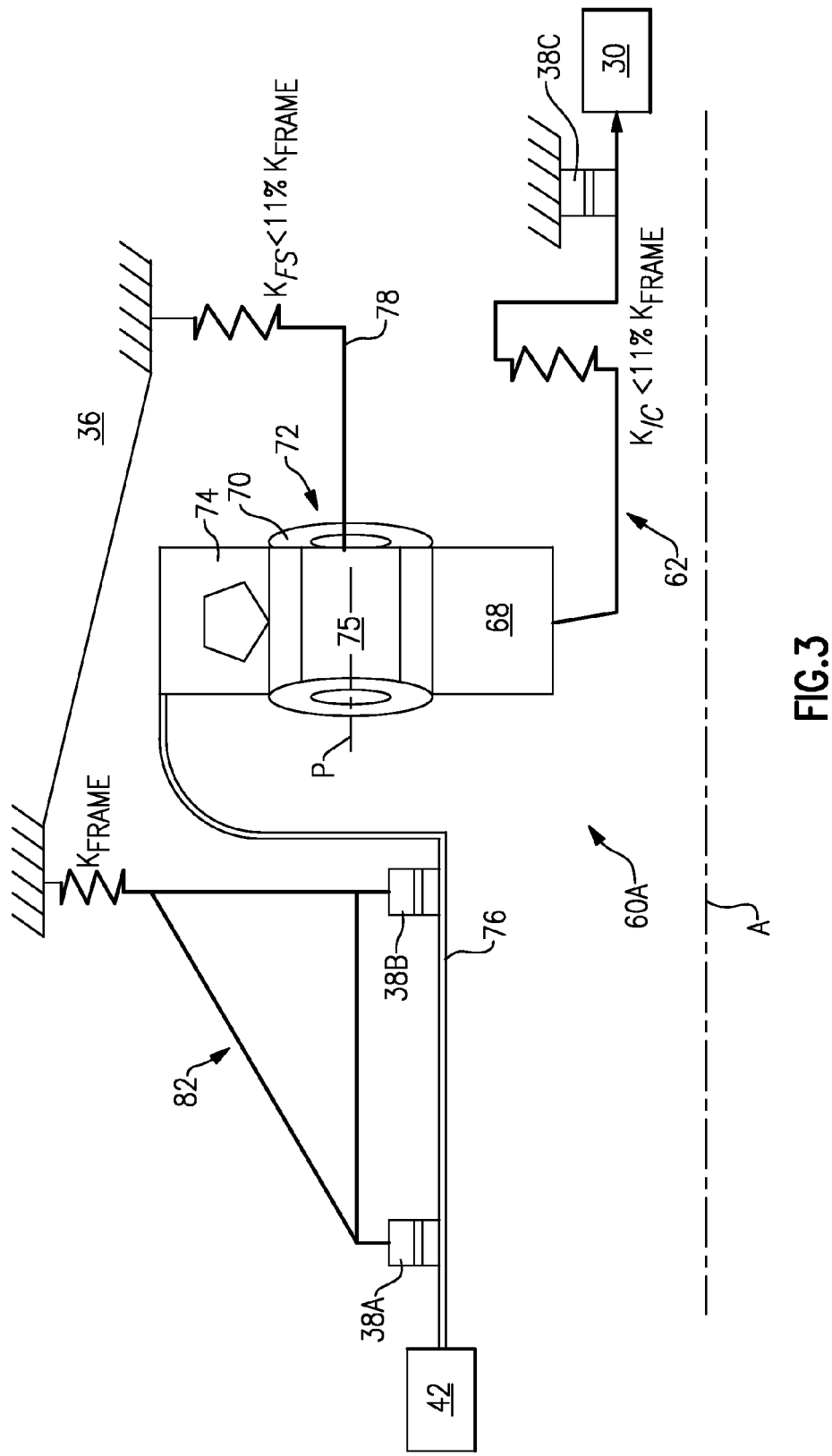
FIG. 3 is a schematic view of a flex mount arrangement for one non-limiting embodiment of the FDGS.

With reference to FIG. 3, a flexible support 78 supports the planet carrier 72 to at least partially support the FDGS 60A with respect to the static structure 36 such as a front center body which facilitates the segregation of vibrations and other transients therebetween. It should be understood that various gas turbine engine case structures may alternatively or additionally provide the static structure and flexible support 78. It is to be understood that the term "lateral" as used herein refers to a perpendicular direction with respect to the axis of rotation A and the term "transverse" refers to a pivotal bending movement with respect to the axis of rotation A so as to absorb deflections which may be otherwise applied to the FDGS 60. The static structure 36 may further include a number 1 and 1.5 bearing support static structure 82 which is commonly referred to as a "K-frame" which supports the number 1 and number 1.5 bearing systems 38A. 38B. Notably, the K-frame bearing support defines a lateral stiffness (represented as Kframe in FIG. 3) and a transverse stiffness (represented as Kframe$^{BEND}$ in FIG. 3) as the referenced factors in this non-limiting embodiment.

In this disclosed non-limiting embodiment, the lateral stiffness (KFS; KIC) of both the flexible support 78 and the input coupling 62 are each less than about 11% of the lateral stiffness (Kframe). In another non-limiting embodiment, the lateral stiffness (KFS; KIC) of both the flexible support 78 and the input coupling 62 are each less than about 20% of the lateral stiffness (Kframe). That is, the lateral stiffness of the entire FDGS 60 is controlled by this lateral stiffness relationship. Alternatively, or in addition to this relationship, the transverse stiffness of both the flexible support 78 and the input coupling 62 are each less than about 11% of the transverse stiffness (Kframe$^{BEND}$). That is, the transverse stiffness of the entire FDGS 60 is controlled by this transverse stiffness relationship.

Figure 4:
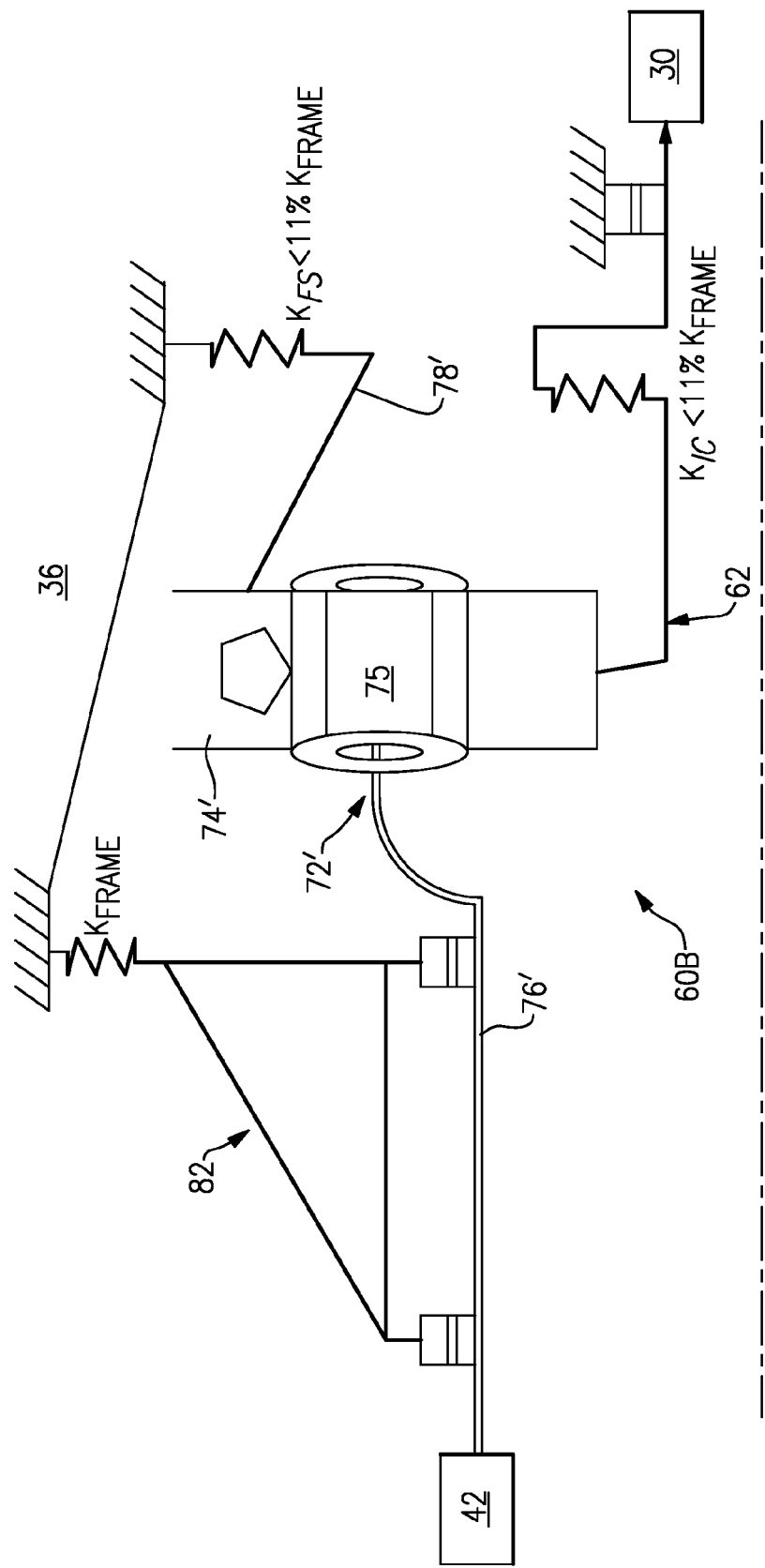
FIG. 4 is a schematic view of a flex mount arrangement for another non-limiting embodiment of the FDGS.

With reference to FIG. 4, another non-limiting embodiment of a FDGS 60B includes a flexible support 78' that supports a rotationally fixed ring gear 74'. The fan shaft 76' is driven by the planet carrier 72' in the schematically illustrated planet system which otherwise generally follows the star system architecture of FIG. 3.

Figure 5:
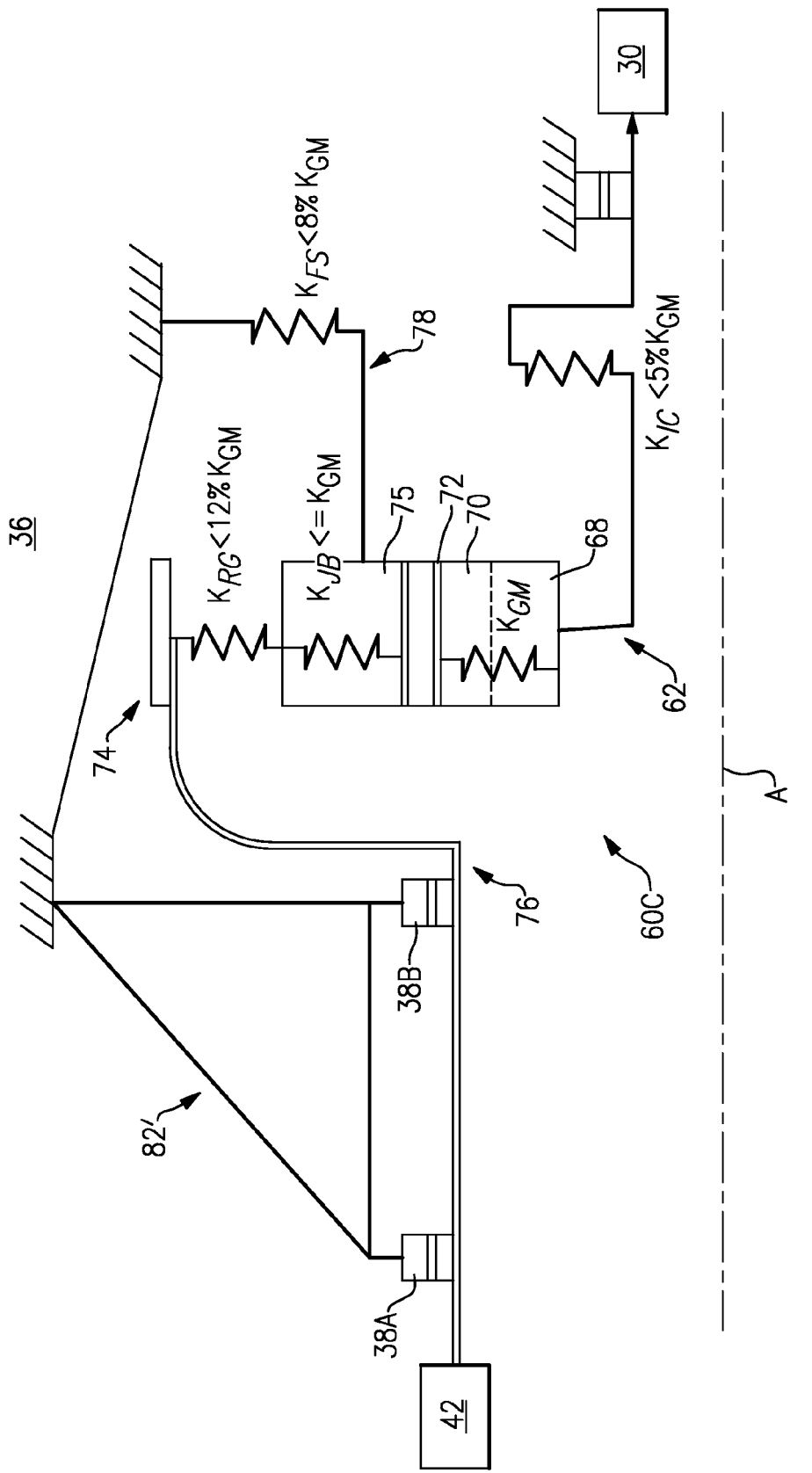
FIG. 5 is a schematic view of a flex mount arrangement for another non-limiting embodiment of a star system FDGS.

With reference to FIG. 5, the lateral stiffness relationship within a FDGS 60C itself (for a star system architecture) is schematically represented. The lateral stiffness (KIC) of an input coupling 62, a lateral stiffness (KFS) of a flexible support 78, a lateral stiffness (KRG) of a ring gear 74 and a lateral stiffness (KJB) of a planet journal bearing 75 are controlled with respect to a lateral stiffness (KGM) of a gear mesh within the FDGS 60.

In the disclosed non-limiting embodiment, the stiffness (KGM) may be defined by the gear mesh between the sun gear 68 and the multiple planet gears 70. The lateral stiffness (KGM) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The lateral stiffness (KJB) may be mechanically defined by, for example, the stiffness within the planet journal bearing 75 and the lateral stiffness (KRG) of the ring gear 74 may be mechanically defined by, for example, the geometry of the ring gear wings 74L, 74R (FIG. 2).

In the disclosed non-limiting embodiment, the lateral stiffness (KRG) of the ring gear 74 is less than about 12% of the lateral stiffness (KGM) of the gear mesh; the lateral stiffness (KFS) of the flexible support 78 is less than about 8% of the lateral stiffness (KGM) of the gear mesh; the lateral stiffness (KJB) of the planet journal bearing 75 is less than or equal to the lateral stiffness (KGM) of the gear mesh; and the lateral stiffness (KIC) of an input coupling 62 is less than about 5% of the lateral stiffness (KGM) of the gear mesh. In another non-limiting embodiment, the lateral stiffness (KRG) of the ring gear 74 is less than about 20% of the lateral stiffness (KGM) of the gear mesh.

Figure 6:
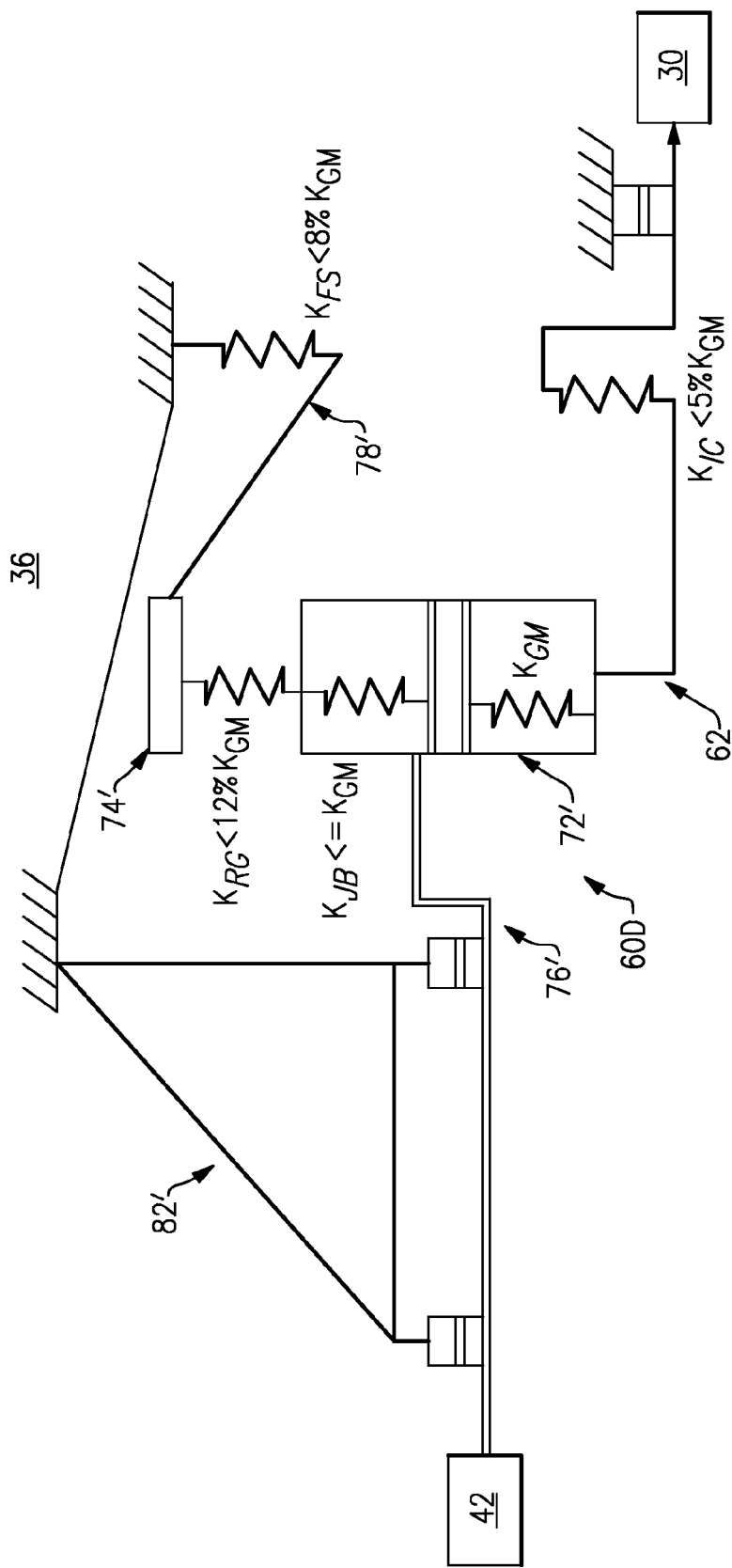
FIG. 6 is a schematic view of a flex mount arrangement for another non-limiting embodiment of a planetary system FDGS.

With reference to FIG. 6, another non-limiting embodiment of a lateral stiffness relationship within a FDGS 60D itself are schematically illustrated for a planetary gear system architecture, which otherwise generally follows the star system architecture of FIG. 5.

It should be understood that combinations of the above lateral stiffness relationships may be utilized as well. The lateral stiffness of each of structural components may be readily measured as compared to film stiffness and spline stiffness which may be relatively difficult to determine.

By flex mounting to accommodate misalignment of the shafts under design loads, the FDGS design loads have been reduced by more than 17% which reduces overall engine weight. The flex mount facilitates alignment to increase system life and reliability. The lateral flexibility in the flexible support and input coupling allows the FDGS to essentially 'float' with the fan shaft during maneuvers. This allows: (a) the torque transmissions in the fan shaft, the input coupling and the flexible support to remain constant during maneuvers; (b) maneuver induced lateral loads in the fan shaft (which may otherwise potentially misalign gears and damage teeth) to be mainly reacted to through the number 1 and 1.5 bearing support K-frame; and (c) both the flexible support and the input coupling to transmit small amounts of lateral loads into the FDGS. The splines, gear tooth stiffness, journal bearings, and ring gear ligaments are specifically designed to minimize gear tooth stress variations during maneuvers. The other connections to the FDGS are flexible mounts (turbine coupling, case flex mount). These mount spring rates have been determined from analysis and proven in rig and flight testing to isolate the gears from engine maneuver loads. In addition, the planet journal bearing spring rate may also be controlled to support system flexibility.

Figure 7:
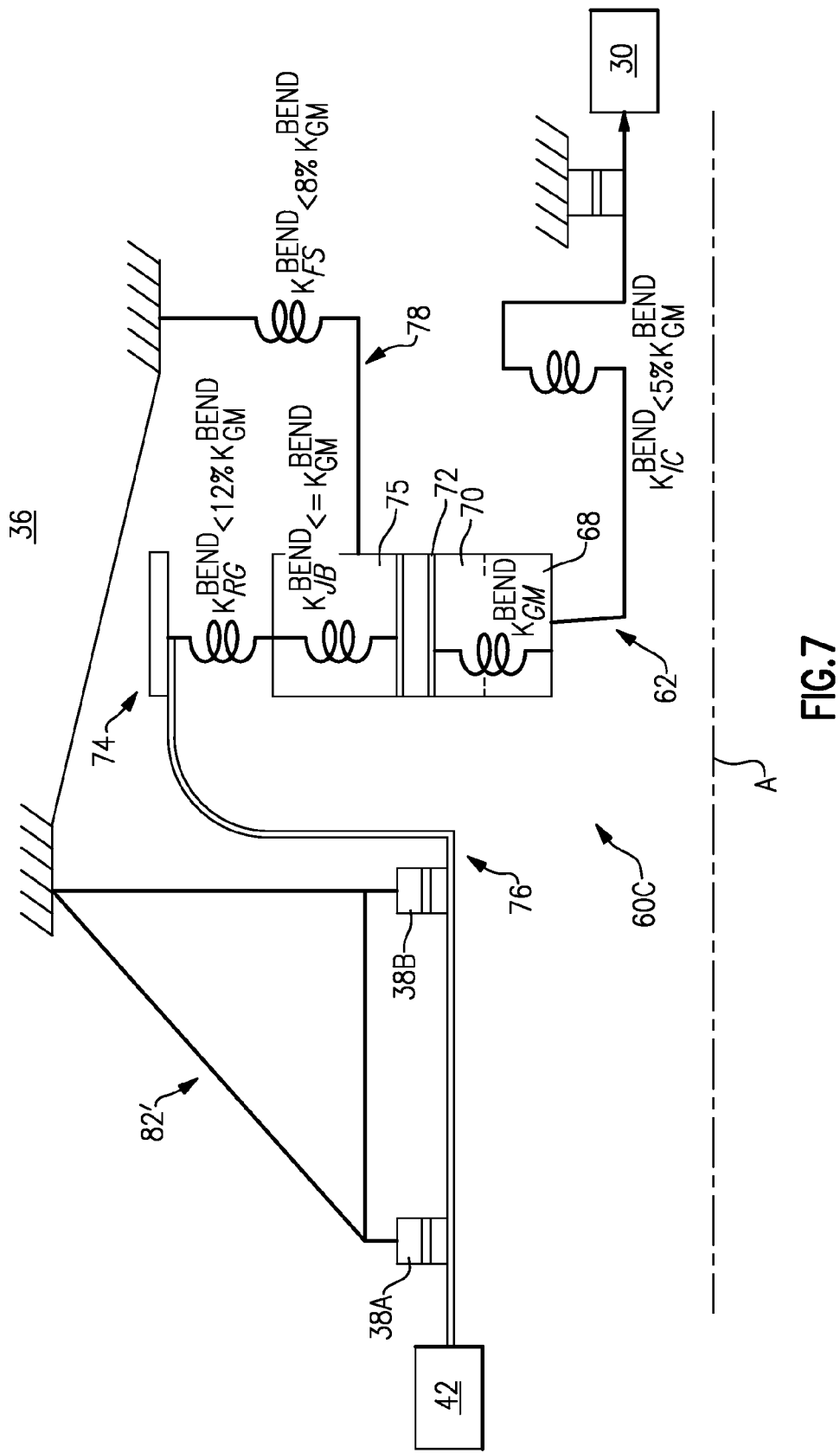
FIG. 7 is a schematic view of a flex mount arrangement for another non-limiting embodiment of a star system FDGS.

FIG. 7 is similar to FIG. 5 but shows the transverse stiffness relationships within the FDGS 60C (for a star system architecture). The transverse stiffness (KIC$^{BEND}$) of the input coupling 62, a transverse stiffness (KFS$^{BEND}$) of the flexible support 78, a transverse stiffness (KRG$^{BEND}$) of the ring gear 74 and a transverse stiffness (KJB$^{BEND}$) of the planet journal bearing 75 are controlled with respect to a transverse stiffness (KGM$^{BEND}$) of the gear mesh within the FDGS 60.

In the disclosed non-limiting embodiment, the stiffness (KGM$^{BEND}$) may be defined by the gear mesh between the sun gear 68 and the multiple planet gears 70. The transverse stiffness (KGM$^{BEND}$) within the FDGS 60 is the referenced factor and the static structure 82' rigidly supports the fan shaft 76. That is, the fan shaft 76 is supported upon bearing systems 38A, 38B which are essentially rigidly supported by the static structure 82'. The transverse stiffness (KJB$^{BEND}$) may be mechanically defined by, for example, the stiffness within the planet journal bearing 75 and the transverse stiffness (KRG$^{BEND}$) of the ring gear 74 may be mechanically defined by, for example, the geometry of the ring gear wings 74L, 74R (FIG. 2).

In the disclosed non-limiting embodiment, the transverse stiffness (KRG$^{BEND}$) of the ring gear 74 is less than about 12% of the transverse stiffness (KGM$^{BEND}$) of the gear mesh; the transverse stiffness (KFS$^{BEND}$) of the flexible support 78 is less than about 8% of the transverse stiffness (KGM$^{BEND}$)

of the gear mesh; the transverse stiffness ($KJB^{BEND}$) of the planet journal bearing 75 is less than or equal to the transverse stiffness ($KGM^{BEND}$) of the gear mesh; and the transverse stiffness ($KIC^{BEND}$) of an input coupling 62 is less than about 5% of the transverse stiffness ($KGM^{BEND}$) of the gear mesh.

Figure 8:
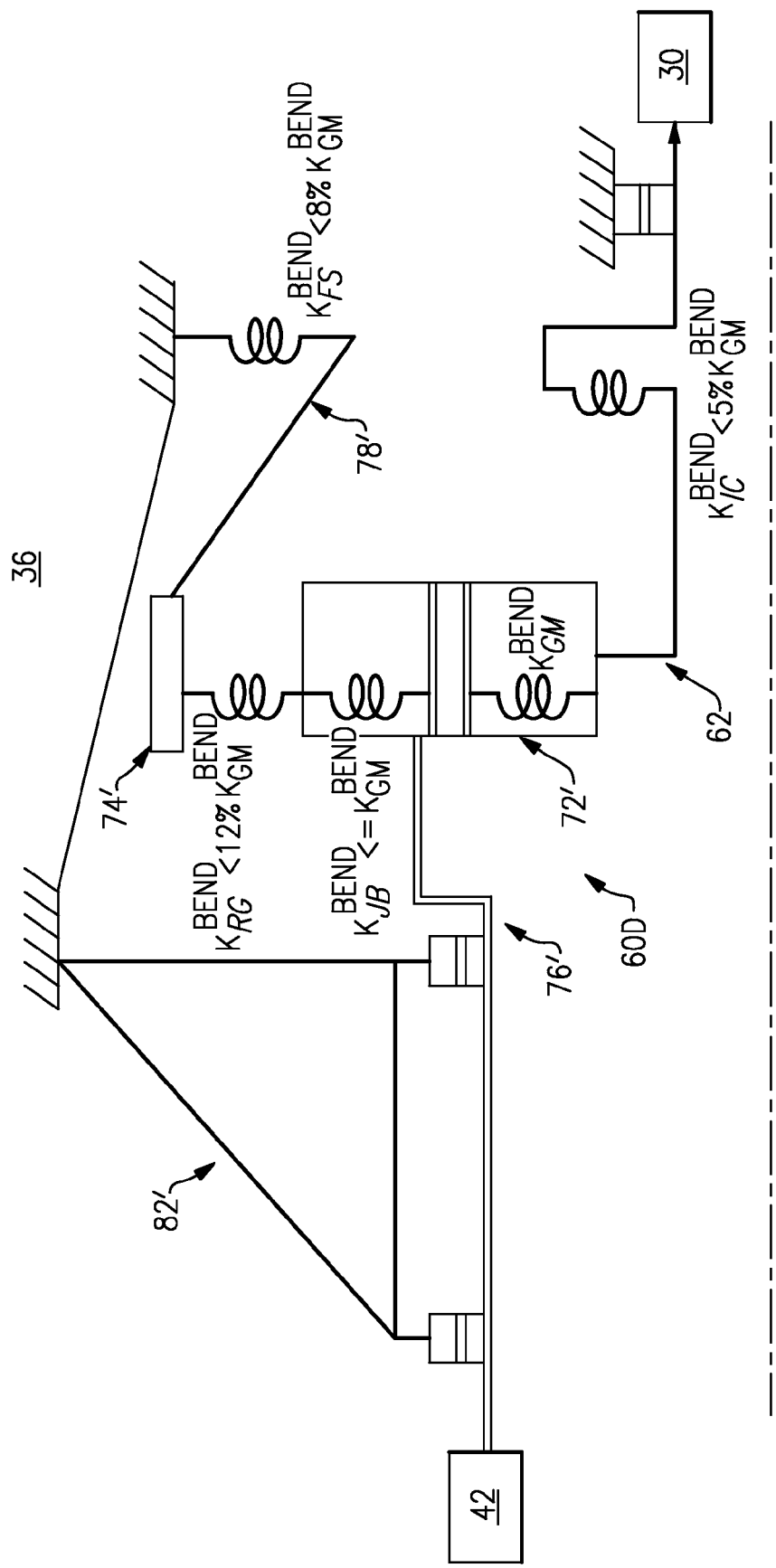
FIG. 8 is a schematic view of a flex mount arrangement for another non-limiting embodiment of a planetary system FDGS.

FIG. 8 is similar to FIG. 6 but shows the transverse stiffness relationship within the FDGS 60D for the planetary gear system architecture.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A geared architecture for a gas turbine engine comprising:
    a fan shaft;
    a frame which supports said fan shaft, said frame defines a frame stiffness;
    a plurality of gears which drives said fan shaft;
    a flexible support which supports the geared architecture and defines a flexible support stiffness that is less than said frame stiffness; and
    an input coupling to said plurality of gears, said input coupling defines an input coupling stiffness which is less than said frame stiffness, wherein said flexible support stiffness and said input coupling stiffness are each less than about 20% of said frame stiffness.

2. The geared architecture as recited in claim 1, wherein said frame and said flexible support are mounted to a static structure of a gas turbine engine.

3. The geared architecture as recited in claim 1, wherein said input coupling is mounted to a sun gear of said gear system.

4. The geared architecture as recited in claim 3, wherein said fan shaft is mounted to a ring gear of said gear system.

5. The geared architecture as recited in claim 4, wherein said plurality of gears form a star system.

6. The geared architecture as recited in claim 3, wherein said fan shaft is mounted to a planet carrier of said gear system.

7. The geared architecture as recited in claim 1, wherein at least one of said flexible support stiffness and said input coupling stiffness are less than about 11% of said frame stiffness.

8. The geared architecture as recited in claim 7, wherein said flexible support stiffness and said input coupling stiffness are each less than about 11% of said frame stiffness.

9. The geared architecture as recited in claim 1, wherein said frame which supports said fan shaft and defines said frame stiffness is a K-frame bearing support, said K-frame bearing support supporting a bearing system that supports said fan shaft.

10. A geared architecture for a gas turbine engine comprising:
    a fan shaft;
    a frame which supports said fan shaft;
    a plurality of gears which drives said fan shaft, said plurality of gears includes a gear mesh that defines a gear mesh stiffness;
    a flexible support for supporting the geared architecture and which defines a flexible support stiffness that is less than said gear mesh stiffness, wherein said flexible support stiffness is less than about 8% of said gear mesh stiffness; and
    an input coupling to said plurality of gears, said input coupling defines an input coupling stiffness with respect to said gear mesh stiffness, wherein said input coupling stiffness is less than about 5% of said gear mesh stiffness.

11. The geared architecture as recited in claim 10, wherein a stiffness of a ring gear of said plurality of gears is less than about 20% of said gear mesh stiffness.

12. The geared architecture as recited in claim 11, wherein at least one of a lateral stiffness and a transverse stiffness of a ring gear of said plurality of gears is less than about 12% of said gear mesh stiffness.

13. The geared architecture as recited in claim 12, wherein at least one of a lateral stiffness and a transverse stiffness of a planet journal bearing which supports a planet gear of said plurality of gears is less than or equal to said gear mesh stiffness.

14. The geared architecture as recited in claim 10, wherein said gear mesh stiffness is defined between a sun gear and a multiple planet gears of said plurality of gears.

15. The geared architecture as recited in claim 10, wherein said plurality of gears floats with said fan shaft.

16. The geared architecture as recited in claim 10, wherein a stiffness of a planet journal bearing which supports a planet gear of said plurality of gears is less than said gear mesh stiffness.

17. The geared architecture as recited in claim 10, wherein a stiffness of a ring gear of said plurality of gears is less than said gear mesh stiffness.

18. A geared architecture for a gas turbine engine comprising:
    a fan shaft;
    a frame which supports said fan shaft, said frame defines a frame stiffness;
    a plurality of gears which drives said fan shaft, said plurality of gears includes a gear mesh that defines a gear mesh stiffness;
    a flexible support supporting the geared architecture and which defines a flexible support stiffness that is less than said gear mesh stiffness; and
    an input coupling to said plurality of gears, said input coupling defines an input coupling stiffness that is less than said gear mesh stiffness, wherein said flexible support stiffness and said input coupling stiffness are each less than said frame stiffness.

19. The geared architecture as recited in claim 18, wherein said flexible support stiffness and said input coupling stiffness are each less than about 20% of said frame stiffness.

20. The geared architecture as recited in claim 18, wherein said flexible support stiffness is less than about 8% of said gear mesh stiffness.

21. The geared architecture as recited in claim 20, wherein said input coupling stiffness is less than about 5% of said gear mesh stiffness.

22. The geared architecture as recited in claim 1, wherein said flexible support supports a carrier of the geared architecture.

23. The geared architecture as recited in claim 1, wherein said flexible support supports a ring gear of the geared architecture.

24. The geared architecture as recited in claim 10, wherein said flexible support supports a carrier of the geared architecture.

25. The geared architecture as recited in claim 10, wherein said flexible support supports a ring gear of the geared architecture.

26. The geared architecture as recited in claim 18, wherein said flexible support supports a carrier of the geared architecture.

27. The geared architecture as recited in claim 18, wherein said flexible support supports a ring gear of the geared architecture.

* * * * *